United States Patent [19]

Hendriks et al.

[11] Patent Number: 5,083,425
[45] Date of Patent: Jan. 28, 1992

[54] POWER INSTALLATION USING FUEL CELLS

[75] Inventors: Rudolf Hendriks, Velp; Hendrik J. Ankersmit, Schiedam, both of Netherlands

[73] Assignee: Turboconsult, Velp, Netherlands

[21] Appl. No.: 527,026

[22] Filed: May 22, 1990

[30] Foreign Application Priority Data

May 29, 1989 [NL] Netherlands .................. 8901348

[51] Int. Cl.$^5$ .................................................. F02C 6/00
[52] U.S. Cl. .................................. 60/39.183; 60/682; 60/683
[58] Field of Search .......... 60/650, 682, 683, 39.183

[56] References Cited

U.S. PATENT DOCUMENTS

| | | | |
|---|---|---|---|
| 2,658,336 | 11/1953 | Traupel | 60/39.183 |
| 3,473,331 | 10/1969 | Fernandes | 60/682 X |
| 4,678,723 | 7/1987 | Wertheim | 429/17 |
| 4,685,287 | 8/1987 | Takuma | 60/39.07 |
| 4,759,997 | 7/1988 | Ohyauchi | 429/19 |
| 4,838,020 | 6/1989 | Fujitsuka | 60/39.07 |
| 4,922,709 | 5/1990 | Hendriks | 60/39.183 |

FOREIGN PATENT DOCUMENTS 3523487  7/1985  Fed. Rep. of Germany .
1549417 10/1967  France .

*Primary Examiner*—Allen M. Ostrager
*Attorney, Agent, or Firm*—Weintraub, DuRoss & Brady

[57] ABSTRACT

A method and installation is proposed for generating electrical energy in an open circuit for a gaseous fluid, comprising a compressor unit driven by a turbine receiving the compressed fluid after its passage through an exhaust gas heat exchanger, said method and installation further comprising a power generator driven by a gas turbine, the circuit also comprising a fuel cell receiving natural gas in its anode from an external source and receiving and gaseous fluid from the compressor unit as an oxidizing agent in its cathode, the electrical power originating from both the generator and the fuel cell forming the output of the method and installation.

4 Claims, 6 Drawing Sheets

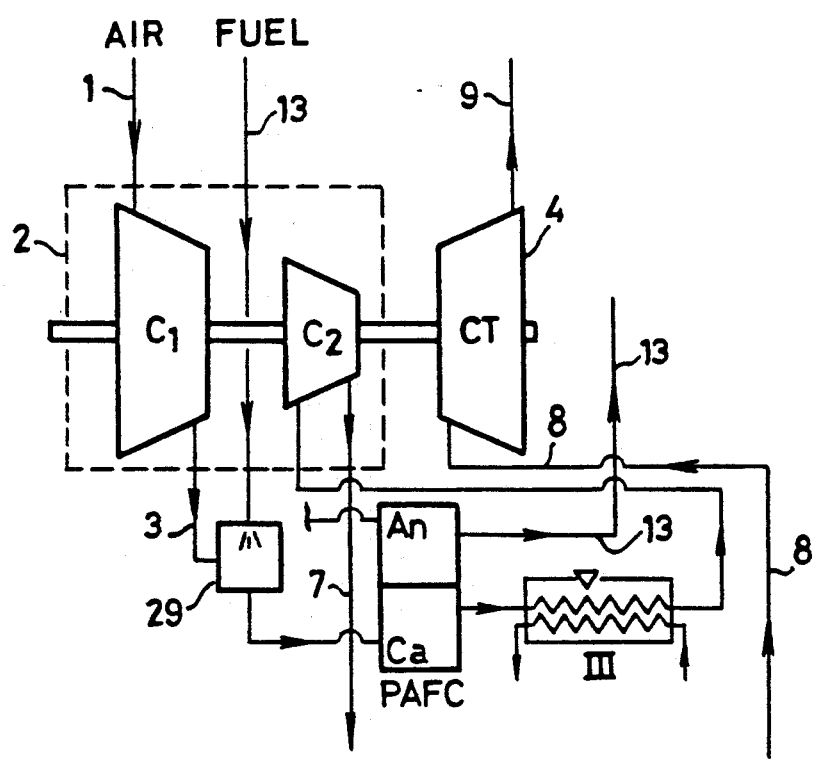
FIG: 6.

POWER INSTALLATION USING FUEL CELLS

SUMMARY OF THE INVENTION

In industry there is a need for an installation for generating electrical energy with a high efficiency, with the environmental pollution being, in addition, kept to a minimum. Hitherto there have been various machines such as motors with internal combustion and gas turbines with which an efficiency of approximately 35% can in fact be achieved, but for which the noxious discharge (in particular, the NO content in the exhaust gases) nevertheless still causes concern. The object of the invention is to provide a method and an installation which provides an appreciable improvement in relation to the two above-mentioned problems: efficiency and noxious discharge.

In this connection, the present invention is based on a method, known per se in various embodiments, for generating electrical energy using a gaseous medium, for example air, which is passed, in an open circuit, first through at least one compressor unit and further through a gas turbine in order to then escape, via a flue gas heat exchanger. The improvement which is proposed according to the present invention is distinguished in that the gaseous medium, which is in the compressed state, is passed through the flue gas heat exchanger to raise the temperature at least once in order to be passed subsequently through one or more turbine(s), coupled to the compressor unit, with the release of energy, the gas flow within the circuit being passed as oxidizing agent into a fuel cell and together with a fuel (reducing agent), delivering electrical energy in said cell prior to, or following after, the development of mechanical energy in the gas turbine.

This method involves the combination of the following improvements:

the compressor turbine used is not fed (as hitherto usual) by exhaust gases of the gas turbine or by another combustion process but mainly by the compressed air itself which is used for that purpose after undergoing an additional temperature increase in the flue gas heat exchanger;

the gaseous medium, which emerges from the above-mentioned compressor turbine with relatively low pressure and temperature, is now used as combustion gas (oxidizing agent) in the fuel cell, together with a reducing agent (for example natural gas);

the pressure of the gaseous medium (oxidizing agent) is low at the inlet of the fuel cell, as is the pressure of the reducing agent, which renders the system more flexible.

The invention makes an operation possible with which, in the first place, a higher electrical efficiency is achieved, and in which the theoretical CARNOT cycle is better approximated than was hitherto achievable. Secondly, this thermal circuit (which is subject to the CARNOT limitation) incorporates an electrochemical system which does not have this limitation and with which efficiencies of at least 55–70% are considered possible, with manageable temperatures even in the order of 1,000° C. Added to this is the fact that in the proposed method, there is always a certain calorific value available in the so-called spent fuel (reducing agent) which can be utilized, for example in a combustor. Moreover, the gas-air mixture which enters the gas turbine after passing through the combustor is not environmentally unfriendly. To be specific, only very small amounts of noxious $NO_x$ discharge (50 gr/GJ) can occur in the flue gases. The catalytic conversion process in the fuel cell produces no noxious products, with the result that the proposed new method virtually does not pollute the environment. A further contribution to reducing the environmental pollution resides in the increase in efficiency from 35% net for a power station to approximately 55 to 70% of this new method. Compared with the prior art, approximately half the fuel is therefore needed to generate the same quantity of electrical energy. This results in a corresponding $CO_2$ reduction. The use of a fuel cell has the double function of delivering electrical energy and of producing hot gases.

The invention also relates to an installation for carrying out the method described above, and therefore for generating electrical energy, by means of a gas stream using a number of mechanical components, comprising a compressor unit coupled to at least one turbine and further comprising at least one gas turbine (power turbine) provided with an output shaft, followed by a flue gas heat exchanger. According to the invention said installation is distinguished by the inter-connection of the components so as to produce an open circuit of the gas stream, the pressure of which is first increased in the compressor unit, then its temperature is also increased in the flue gas heat exchanger, after which the gas stream eventually, via a burner chamber, is subsequently passed to the compressor turbine(s), and finally it flows with a slight overpressure in the direction of the gas turbine but in doing so, after first having been passed upstream or subsequently downstream of said gas turbine as an oxidizing agent through a fuel cell provided in the circuit.

The application of this cell may cause an additional increase in efficiency with the same air stream and a somewhat less fuel consumption in the burner chamber. This effect is due to the waste heat of the cell increasing the heat content of the burner chamber. When applying a high temperature fuel cell (in the order of 1000° C., such as with a solid oxide fuel cell SOFC) the burner chamber of the gas turbine might even become virtually superfluous. The direct current from the fuel cell may be directly used as direct current or after conversion can be used as alternating current. A third possibility consists in the supply of the direct current to the electrical generator of the gas turbine.

The installation just described comprises turbine components known per se, with the result that use can be made of components already developed industrially to assemble an installation which, as a consequence of the high efficiency, results in a reduction in the $CO_2$ pollution of the environment in the order of magnitude of one half with respect to known machines such as motors with internal combustion, boiler-stream turbine installations and conventional gas turbines. A reduction in the $NO_x$ emission can be obtained of more than 50%. In this connection, no account has yet been taken of the possibility of environmental depollution if used in heat and power installations (total-energy concept).

It is pointed out that two types of fuel cell are, in particular, suitable for use in the procedure and the installation according to the invention. The first type is the so-called MCFC (molten carbonate fuel cell) with a working temperature of approximately 650° C. The other type is the so-called PAFC (phosphoric acid fuel cell) with a working temperature of approximately 200°

C. The solid oxide fuel cell (SOFC) can also be used, working temperature approximately 1,000° C.

The position of the fuel cell in the open circuit is preferably situated between the compressor turbine (CT) and the power turbine (PT). A position more downstream and even beyond the gas turbine is possible. This is shown in dotted lines in the annexed drawings. Also a position upstream of the compressor turbine is conceivable and even still further forward in the circuit.

DISCUSSION OF THE PRIOR ART

Different types of fuel cells are described in the following papers:

1) H. A. Liebhafsky and E. J. Cairns "Fuel cells and fuel batteries", Wiley & Son, New York (1968), Chapter 12, pages 524-554
2) A. J. Appleby and F. R. Foulkes, "Fuel Cell Handbook", Van Nostrand Reinholt, New York (1989)
3) Supramanian Srinivasan, Journal of the Electrochemical Society, 136 (2), Feb. 1989, pages 41C-48C.

It is further observed that the U.S. Pat. No. 4,678,723 issued to WERTHEIM relates to a phosphoric acid fuel cell PAFC in combination with an autothermal reformer for delivering a gaseous mixture to a turbine which is driving a compressor unit; the fuel cell is cooled by water droplets and injected water fog for increasing its output. There is no gas turbine with an exhaust gas heat exchanger for increasing the temperature of the compressed gaseous mixture.

SURVEY OF THE DRAWINGS AND TABLE

The FIGS. 1-6 show very diagrammatically some embodiments of the installation in which electrical energy is generated. The table gives an example for a medium size plant.

DESCRIPTION OF PREFERRED EMBODIMENTS

Figure 1:
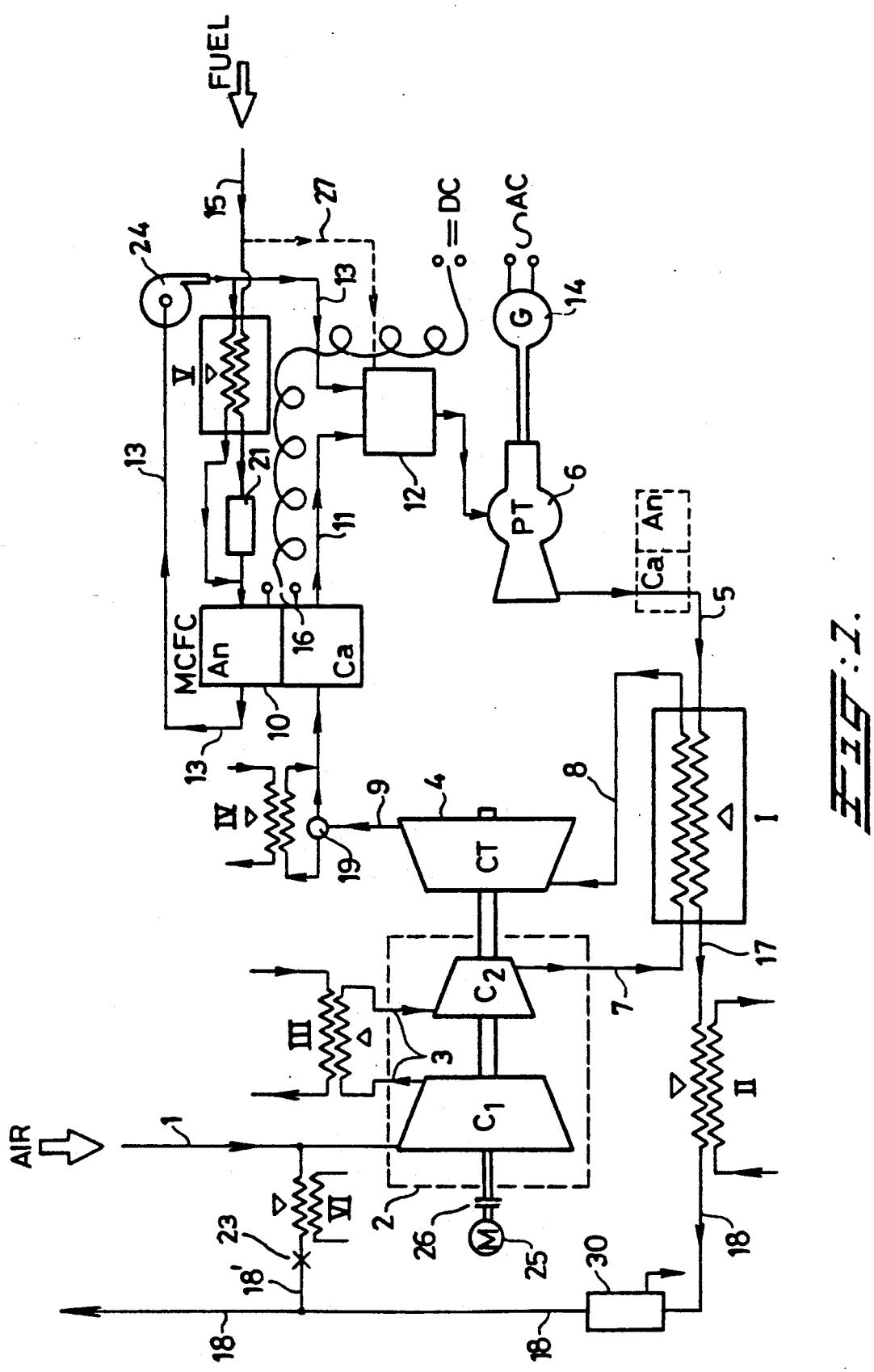

FIGS. 1-5 show a supply 1 of gaseous medium, for example air. Said medium passes through an open circuit starting with a compressor unit 2, which in this case comprises a low-pressure compressor $C_1$ and a high-pressure compressor $C_2$ which are connected to each other by a line 3. This connecting line incorporates a heat exchanger III as the normal intercooler. The compressor unit 2 is driven by a compressor turbine 4 which is constructed in this case as a single turbine CT for both compressors. It is also possible to drive each of the compressors $C_1$ and $C_2$ by an individual turbine.

Fitted in the open circuit is a flue gas heat exchanger I which is connected via a line 5 to a gas turbine 6 (the power turbine PT) for generating electrical energy. The high-pressure compressor $C_2$ is connected via a line 7 to the flue gas heat exchanger I and the gaseous medium heated therein flows, in the embodiment according to FIGS. 1, 2 and 4, via a line 8 to the compressor turbine 4. After passing through this turbine, the gaseous medium, reduced in temperature, flows in the shown embodiment via a line 9 to a fuel cell 10 for the purpose of feeding the cathode of said cell with said medium, that is to say, with oxidizing agent. The medium, somewhat raised in temperature, then flows via a line 11 to a so-called combustor 12 which is also provided with a supply 13 of "spent fuel" as will be explained further below. The gas turbine 6 drives an electrical generator 14.

As an alternative solution, the drawings show in dotted lines the location of the fuel cell 10 downstream of the gas turbine 6. The connecting conduits should be adapted in a corresponding manner. The further description of the invention also applies to this variant. The specific advantages of this location of the fuel cell are the following:

the pressure control is easier;
it will be possible to eliminate the heat exchanger II.

In the chosen construction according to FIGS. 1-4, the fuel cell 10 is of the type MCFC (molten carbonate fuel cell). Said cell has an electrical efficiency of approximately 55% and the anode is provided with a supply 15 of fuel, that is to say, reducing agent such as a hydrogen-rich gas. It is pointed out, however, that, in the so-called internal reforming variant, a direct use of natural gas as fuel is also possible. As the final product in said fuel cell 10, direct current is produced at the terminals 16.

It is pointed out that three other heat exchangers II, IV and V are also depicted in the figures. The heat exchanger II is situated in the last section of the discharge line 17 of the flue gas heat exchanger I and utilizes in this manner a further portion of the heat present at the end 18 of the open circuit. The heat exchanger IV (FIG. 1) is switched on or off with the aid of a shut-off valve 19. In the one position of said shut-off valve, the gas stream is passed directly to the fuel cell 10 from the compressor turbine 4 via the line 9. In the other position of the shut-off valve 19, said gas stream or a portion thereof is passed through the heat exchanger IV for the purpose of heating or cooling the gas stream. This may sometimes be required. The heat exchanger V serves to heat the fuel fed in via the line 15.

In case an FCMC-cell is applied, the feed of the cathode should contain air with a sufficient amount of $CO_2$. Under those circumstances a recycling of $CO_2$ within the system is the most obvious solution. This can take place by applying so-called selective separation techniques, for instance by incorporating membranes 30 in the lines 5, 17 or 18. A recycling of steam may be effected in line 18, eventually after separation of water after the heat-exchanger II in order to increase the proportion of inert gas. In the FIGS. 1-4 a branch conduit 18' is shown, comprising a control valve 23 and a heat exchanger VI as a schematic representation of this recycling process. With different types of fuel, such an additional conduit is not used, vide FIGS. 5 and 6. A centrifugal compressor 24 is applied for nebulizing the fuel.

Figure 2:
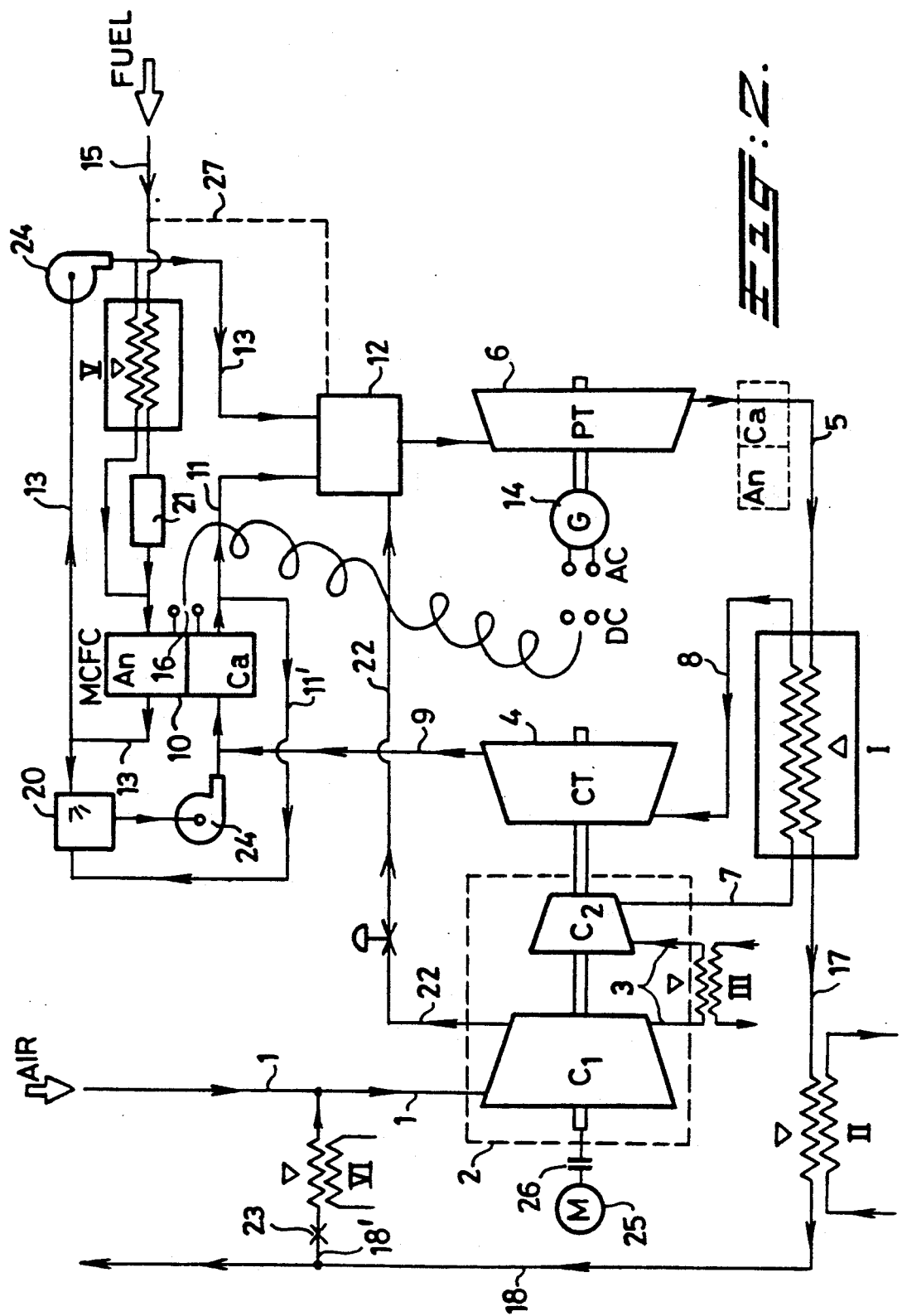

FIG. 2 shows an auxiliary burner 20 in a branch 11' of the line 11 to the gas turbine 6 for the purpose of possibly additionally heating the gaseous medium with the aid of the above-mentioned "spent fuel" originating from the line 13 from the anode of the fuel cell 10 used. Said gaseous "spent fuel" contains, for example, 15% $H_2$ and furthermore $CO_2$, $H_2O$ and $N_2$, with the result that a significant heating power is still available. In addition, said "spent fuel" is at an appreciable temperature. As a result of this, said gas can be used in the combustor 12 or in the auxiliary burner 20 (FIGS. 2-4) or may be fed back to the fuel preparation section. A purifying device 21 is generally used in the line 15. In the combustor 12 there may be an excess of $H_2$ originating from the "spent fuel" from the line 13. Additional air may therefore be supplied from the first compressor $C_1$ via a line 22 in order to achieve complete combustion. Alternatively a portion of the fuel (amongst others: spent fuel) can be used to improve the condition of the fuel entering via line 15 (for instance by steam-reforming). As a portion of $CO_2$ is directly recycled to the anode, the stream of fluid through the conduit 18' will be greatly reduced.

Figure 3:
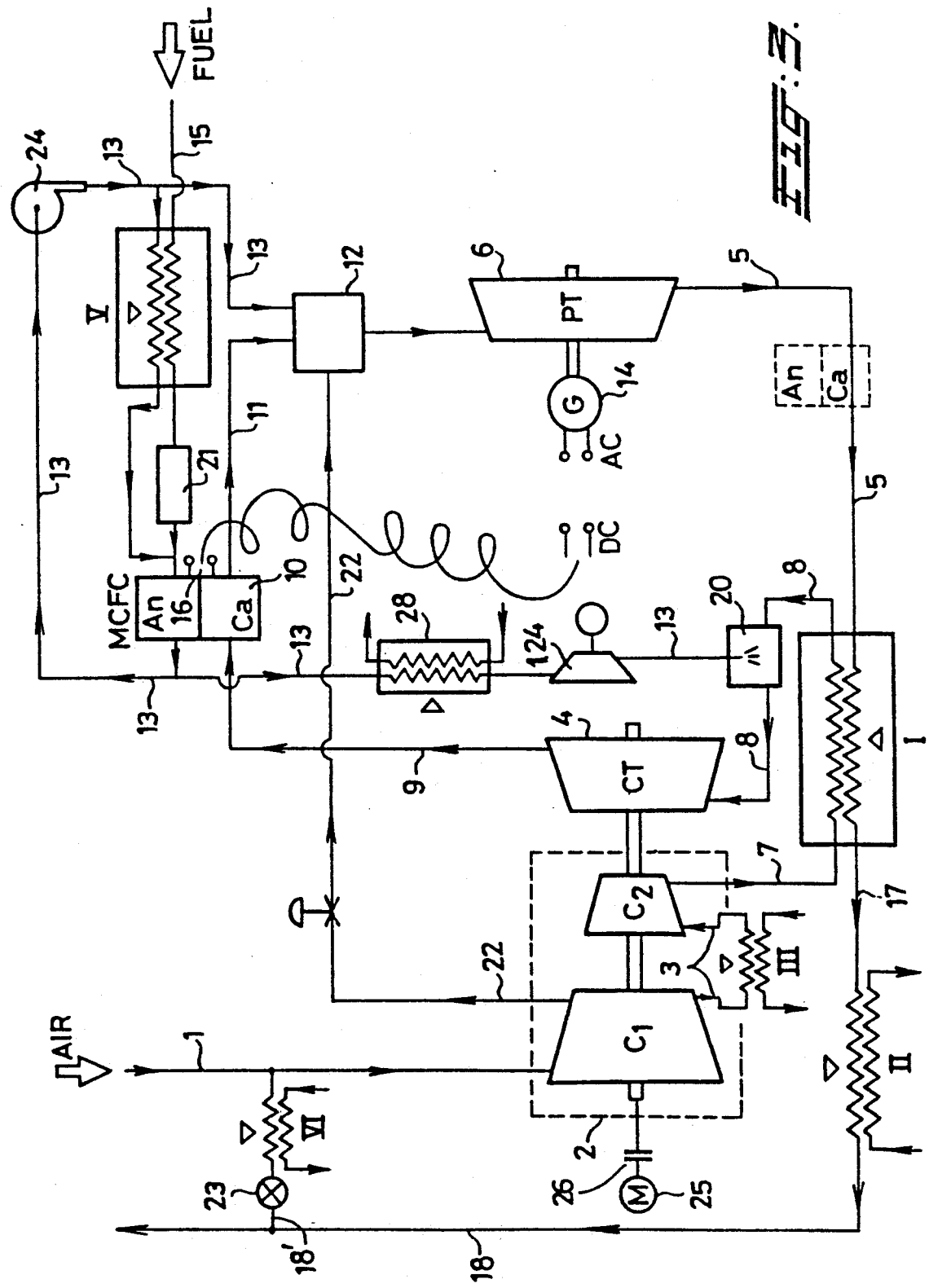

FIG. 3 shows that, to improve the system thermodynamically, the auxiliary burner 20 has been moved the higher pressure level (for instance 885 kPa, equal to 8.85 bar) in line 8 and is used to heat the air to for instance 850° C. upstream of the compressor turbine 4. This has the result that the temperature downstream of said turbine is for instance 620° C. as required by the MCFC fuel cell. At the same time, the pressure will decrease to for instance 290 kPa (=2.93 bar). In order to convey a portion of the "spent fuel" to the higher pressure level, a compressor 124 is indicated which is preceded by an additional cooler 28 to lower the gas from 677° C. to 30° C.

Figure 4:
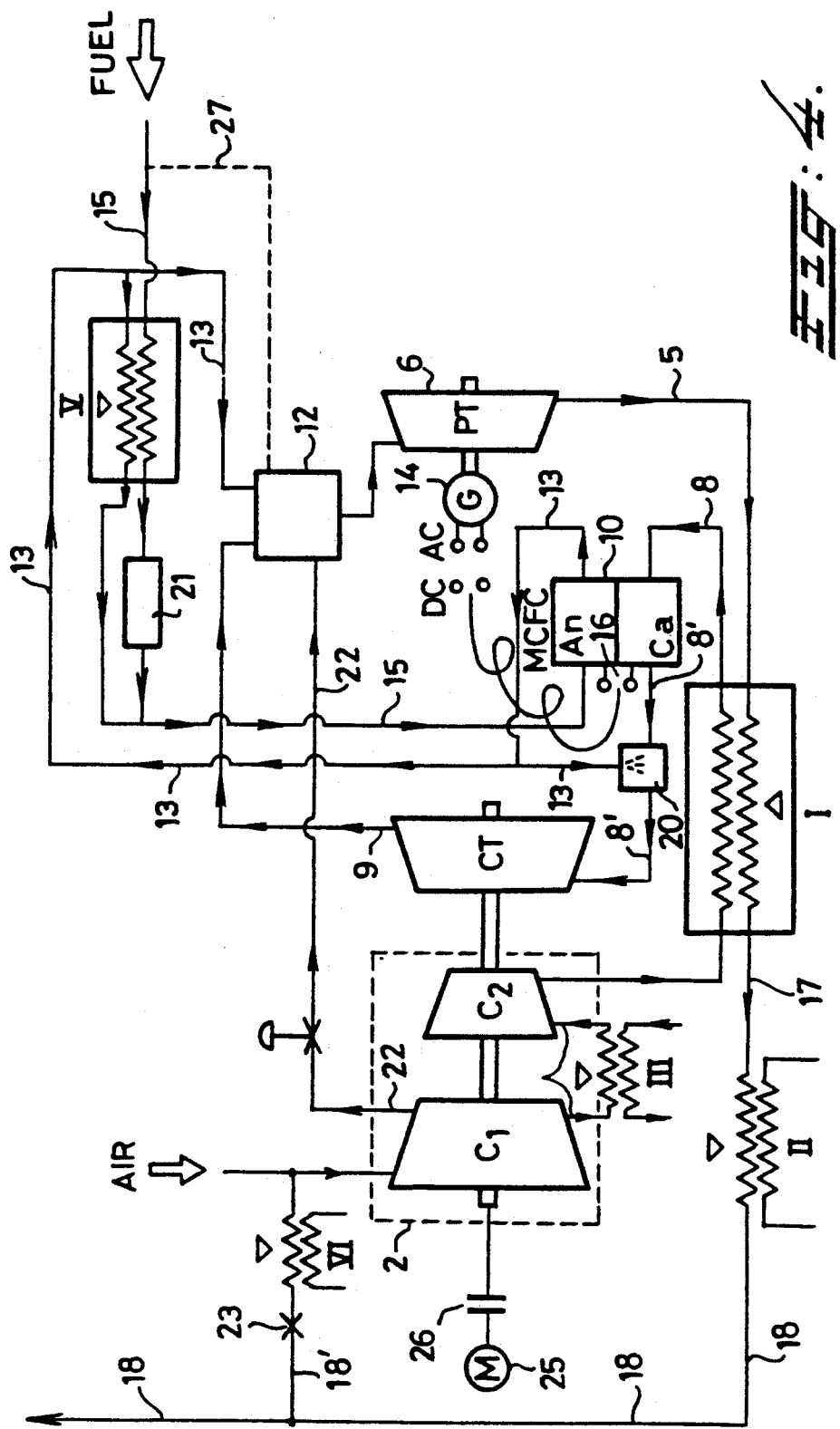

In the installation according to FIG. 4, the fuel cell 10 has been incorporated in the high-pressure section (approximately 900 kPa) of the circuit. A portion of the "spent fuel" from the anode of the fuel cell 10 is passed through the line 13 to the auxiliary burner 20 which is in the line 8' of the oxidizing agent stream coming out of the cathode of the fuel cell 10.

Figure 5:
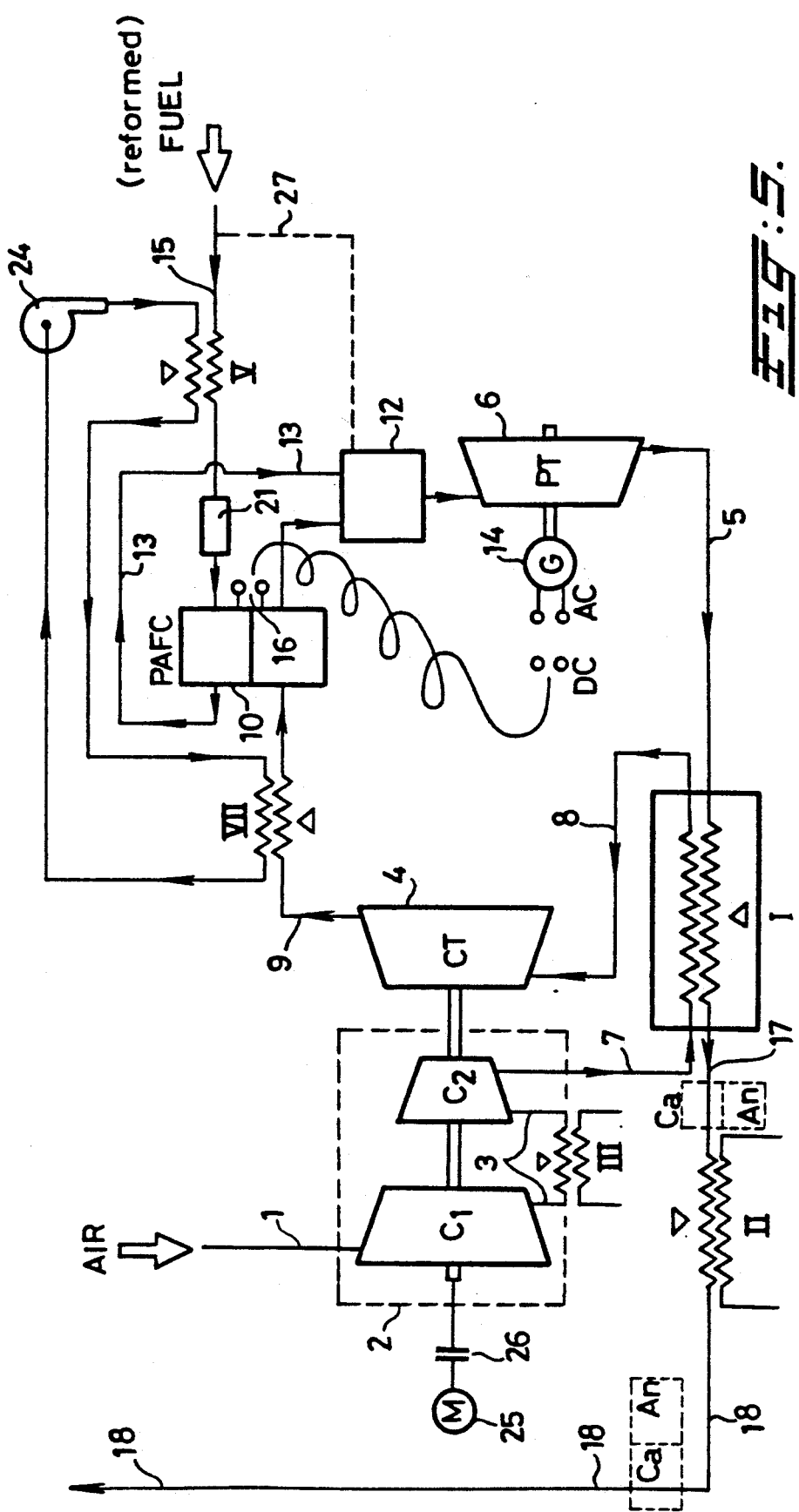

In the installation according to FIG. 5, the fuel cell 10 comprises a PAFC (a phosphoric acid fuel cell) with a working temperature of 200° C. The cell is placed in the low-pressure section of the circuit, in the line 9 from the compressor turbine 4. The exit temperature (for instance 470° C.) of said turbine has to be lowered to 200° C. by means of a cooler VII. In practice both heat exchangers V and VII will be combined into one device. As a PAFC does not permit internal reforming, the fuel entering through the line 15 must be a hydrogen-rich gas. In FIG. 6, the fuel cell 10 has been incorporated in the circuit downstream of the low-pressure compressor $C_1$ and downstream of an additional burner 29 to raise the temperature from 137° C. to 200° C.

It is pointed out that, instead of using a fuel cell of the type MCFC or PAFC, the use of the type SOFC (solid oxide fuel cell) is also conceivable. It is further observed that low-temperature fuel cells such as alkaline fuel cells AFC and polymer fuel cells SPFC or SPEFC may be used in the relatively cool lines near the compressors and intercooler, as well as in the relatively cool exhaust line 17, 18 downstream of recuperator I. A description of all these fuel cells can be found in the above-mentioned manuals.

The circuit contains one or more centrifugal compressors 24 for the purpose of bringing about an increase in pressure for the benefit of certain sections of the circuit, or for the injection of the fuel into the burner chamber 12. Such a centrifugal compressor is not required in all of the described variants of the installation.

The installation is started with a motor 25 which is connected via a clutch 26 to the compressor unit 2. These compressors are brought to approximately 20% of the working speed. Then a burner nozzle (not depicted) is ignited by means of a spark plug (not depicted either) inside the combustor 12. The line 27 caters for the supply of fuel. The generator G is synchronized to the mains, after which the temperature of the turbine 6 is increased.

It is pointed out that the installation may also form part of a heat and power station (total-energy system) and that the gases from the line 18 can be supplied to a greenhouse to increase the $CO_2$ assimilation process.

A number of values for an imaginary installation (FIG. 1) relating to the quantity per unit time of the gas stream, the temperatures occurring and the pressures at the inlet and the outlet of the various compressors and heat exchangers and also at the compressor turbine 4, the fuel cell 10 and the power turbine 6 have been incorporated in the table below.

TABLE

| Component | Temp. °C. | Pressure, kPa | Mass flow |
|---|---|---|---|
| medium (air) | 15 | 100 | 20,000 kg/h |
| 1st compressor | 15 | 100 | |
| | 135 | 300 | |
| Heat exchanger III | 135 | 300 | |
| | 25 | | |
| 2nd compressor | 25 | 300 | |
| | 155 | 900 | |
| Heat exchanger I | 155 | 900 | |
| | 700 | | |
| compr. turbine | 700 | 900 | power |
| | 470 | 250 | delivered |
| Heat exchanger IV | 470–620 | 250 | ↓ |
| MCFC | 620 | | |
| | 670 | 250 | 3,750 kW |
| combustor 12 | 670–950 | 250 | |
| power turbine | 950 | 250 | |
| | 750 | 100 | 1,250 kW |
| Heat exchanger I | 750 | | |
| | 200 | 100 | TOTAL 5,000 kW |

A typical system efficiency value will be 57%

What is claimed is:

1. A method of generating electrical energy using a gaseous medium comprising the steps of:
   (a) passing a gaseous medium through a compressor unit;
   (b) passing the compressed gaseous medium from the compressor unit through a flue gas heat exchanger in order to raise the temperature thereof;
   (c) passing the gaseous medium through a gas turbine, the gas turbine being connected to the compressor unit;
   (d) passing the compressed gaseous medium also into and through a fuel cell, the gaseous medium operable as an oxidizing agent to oxidize a fuel in the fuel cell, the fuel cell producing electrical energy from the oxidation of the fuel therewithin;
   (e) passing the gaseous medium from the fuel cell through a further turbine, the gaseous medium passing out of the further turbine as exhaust, and;
   (f) leading the exhaust from the further turbine through said flue gas heat exchanger.

2. The method of claim 1, wherein the gaseous medium comprises air and the fuel comprises a hydrogen-rich gas.

3. The method of claim 2, wherein the fuel comprises natural gas.

4. The method of claim 1, wherein the gas turbine is coupled to an electrical generator, and wherein the fuel cell develops direct current which is supplied to the electrical generator.

* * * * *